(12) United States Patent
Fulton et al.

(10) Patent No.: US 7,599,859 B2
(45) Date of Patent: Oct. 6, 2009

(54) COMMUNICATIONS NETWORK INTERFACE FOR USER FRIENDLY INTERACTIVE ACCESS TO ONLINE SERVICES

(75) Inventors: John W. Fulton, Columbus, OH (US); Thomas N. Shafer, Columbus, OH (US); Marianne Shepard, Columbus, OH (US)

(73) Assignee: Datatreasury Corporation, Plano, TX (US)

( * ) Notice: Subject to any disclaimer, the term of this patent is extended or adjusted under 35 U.S.C. 154(b) by 567 days.

(21) Appl. No.: 11/033,672

(22) Filed: Jan. 12, 2005

(65) Prior Publication Data

US 2005/0125348 A1 Jun. 9, 2005

Related U.S. Application Data

(63) Continuation of application No. 09/506,405, filed on Feb. 17, 2000, now abandoned, which is a continuation of application No. 08/962,912, filed on Oct. 27, 1997, now Pat. No. 6,182,052, which is a continuation of application No. 08/254,146, filed on Jun. 6, 1994, now abandoned.

(51) Int. Cl.
*G06Q 40/00* (2006.01)
(52) U.S. Cl. .......................... 705/26; 705/30
(58) Field of Classification Search .............. 705/10–44
See application file for complete search history.

(56) References Cited

U.S. PATENT DOCUMENTS 4,071,697 A * 1/1978 Bushnell et al. ............ 379/67.1

5,345,501 A * 9/1994 Shelton ....................... 379/88.2
5,958,016 A * 9/1999 Chang et al. ................ 709/229
7,139,387 B2 * 11/2006 Dahari ........................ 379/229

OTHER PUBLICATIONS

"Videldisc and Optical Disk", News and Notes, vol. 5, No. 4, Jul.-Aug. 1985.*
Citicorp Skips Computer in new Home-Banking Plan; By Robert Guenther: The Wall Street Journal, Wed. Feb. 28, 1990.*

* cited by examiner

*Primary Examiner*—Frantzy Poinvil
(74) *Attorney, Agent, or Firm*—Hershkovitz & Associates, LLC; Abraham Hershkovitz

(57) ABSTRACT

In a communications network for accessing an account, conducting a transaction, obtaining services or obtaining information from a remote location, a programmable user interface is adapted to provide a multiplicity of separate choices perceptible to a user on a user operable terminal. The terminal is capable of registering for transmission to a service platform, a user's input to the terminal corresponding to at least one choice from the multiplicity, including banking, bill paying, shopping, travel, flowers and gifts and information. The user interface includes means for communicating the user selected choice to a service platform, means for communicating by voice, TDD or data transmission through the service platform, and means in the terminal for permitting the user to communicate directly by at least one of an interactive voice, TDD or data transmission communication with respect to a provider in the user's selection from the multiplicity.

92 Claims, 11 Drawing Sheets

BANKING— 7 ACCOUNTS
PLEASE SELECT ACCOUNT:
614-555-1234

☐ CHECKING
  1234-567890-1          BALANCE: $3,129.07          START OVER
  HOUSE ACCOUNT

☐ MONEY MARKET
  4567-890123-4          BALANCE: $2,545.10
  MY MONEY MARKET

☐ SAVINGS
  5678-901234-5          BALANCE: $2,529.07
  TIM'S UNIVERSITY

☐ VISA REGULAR
  1234-5678-9012-3456                                HANG UP
  JOHN'S CURRENT VISA

| HUNTINGTON DIRECT | TRANSFER FUNDS |

FIG.4

CHECKING ACCOUNT # 1234-567890-1
HOUSE ACCOUNT

| LATEST TRANSACTIONS | LAST STATEMENT | START OVER |

CHECKING BALANCE:                3,129.07

LAST STATEMENT DATE:             2/5/92
LAST STATEMENT BALANCE:          2,501.31

INTEREST RECEIVED THIS YEAR:     21.25
INTEREST RECEIVED LAST YEAR:     105.54

CHECKING RESERVE LINE OF CREDIT: 1,000.00

DONE

| HUNTINGTON DIRECT | TRANSFER FUNDS |                HANG UP

FIG.5

INSTALLMENT LOAN # 12345678901
NEW CAR

[INTEREST INFORMATION]   [START OVER]

LOAN AMOUNT                55,000.00
BALANCE:                   29,129.07
TERM:                      10 MONTHS
MATURITY DATE:             6/1/95
COLLATERAL:        (COLLATERAL INFORMATION)
NEXT PAYMENT:              1/1/92
AMOUNT:                    554.56

[DONE]

[HUNTINGTON DIRECT]   [HANG UP]

FIG.6

CHECKING ACCOUNT # 1234-567890-1
HOUSE ACCOUNT

[BALANCE INFORMATION]   [LAST STATEMENT]   [START OVER]

4891 6/18 CHECK           50.00
4890 6/18 CHECK            7.54
     6/18 DEPOSIT        +238.50
4889 6/17 CHECK           29.44
4888 6/16 CHECK          322.00
     6/16 COLUMBIA GAS    60.00
     6/14 CASH-CLINTONVILLE  60.00
4885 6/14 CHECK           27.00
4884 6/14 CHECK           45.00

[DONE]

[HUNTINGTON DIRECT]  [TRANSFER FUNDS]  [OVERDRAFT PROTECTION]  [HANG UP]

FIG.7

TRANSFER FUNDS—
TOUCH BUTTON TO ENTER OR CHANGE INFORMATION.

VERIFY THAT THE INFORMATION BELOW IS CORRECT. PRESS DONE TO ACCEPT.

FROM

TO

AMOUNT

BACK

DONE

FIG.8

BANKING—TRANSFER FUNDS
FUNDS TRANSFER HAS BEEN COMPLETED.

THE CONFIRMATION NUMBER FOR TRANSACTION IS 1234567890 PLEASE NOTE IT FOR YOUR RECORDS.

FROM: CHECKING
1234-567890-1
HOUSE ACCOUNT

BEFORE: $3,129.07
AFTER: $3,079.07

TO: SAVINGS
7890-123456-7
VACATION

BEFORE: $300.00
AFTER: $350.00

AMOUNT: $50.00

DONE

FIG.9

STOP PAYMENT ON A SINGLE CHECK
TOUCH BUTTON TO ENTER OR CHANGE
INFORMATION.
VERIFY THE INFORMATION SHOWN BELOW. PLEASE
PROVIDE AS MUCH INFORMATION AS POSSIBLE.
PRESS DONE TO CONTINUE. PRESS BACK TO CANCEL.

CHECK NUMBER          BACK

CHECK DATE

CHECK AMOUNT          DONE

REASON

FIG.10

BANKING-PRODUCT & SERVICE
INFORMATION

| CHECKING PLANS | SAVINGS AND INVESTMENT | EDUCATION PLANS | START OVER |
| RETIREMENT PLANS | TRUST PLANS | LENDING PLANS | BACK |
| PLAN 7-TO BE DETERMINED | | | |
| HUNTINGTON DIRECT | | | HANG UP |

FIG.11

COMMUNICATIONS NETWORK INTERFACE FOR USER FRIENDLY INTERACTIVE ACCESS TO ONLINE SERVICES

RELATED APPLICATIONS

This application is a continuation of application Ser. No. 09/506,405 filed on Feb. 17, 2000, now abandoned which in turn was a continuation of application Ser. No. 08/962,912, filed Oct. 27, 1997 now U.S. Pat. No. 6,182,052 issued on Jan. 30, 2001, a continuation of application Ser. No. 08/254,146, filed Jun. 6, 1994, now abandoned. The specifications, drawings and appendices of the foregoing applications are incorporated herein as if set out in full.

FIELD OF THE INVENTION

This invention relates to a communications network designed to provide user access, presentation and gateway functions that permit a user to communicate with financial institutions and other providers of goods and services via an interactive telecommunications device, and more particularly, to a novel user interface at remote locations in the network for accessing services and information and for transaction processing.

BACKGROUND OF THE INVENTION

An increasing number of people are demanding more convenience to access various types of consumer services, including banking, bill paying, shopping, travel and others. Catering to the demand for added convenience in banking services are ATMs, direct deposit, and banking by telephone and mail. Personal computers have not been accepted as a convenient provider means for these services. Only a small percentage of the public have personal computers with modems, and even fewer have the capability to access any network platform offering banking services.

Marketing research has indicated a consumer demand for convenience-driven services delivered via a screen-based interactive telecommunications device or terminal, such as the telephone/modem or terminal device announced by AT&T and identified by the trade designation AT&T Smart Phone™.

There is a need for a user interface for such an interactive telecommunications terminal that will efficiently enable users to have access to many types of services from their homes or offices. The present invention provides such a user interface, which is supported by a service platform network, for communicating with a service provider, thus enabling users to have access to a large variety of services from a single location. Through the present invention, users can perform a multitude of transactions electronically via the terminal, such as banking, purchasing merchandise, making travel arrangements and paying bills, from the convenience of home or office.

SUMMARY OF THE INVENTION

The present invention includes a programmable user interface adapted to provide a multiplicity of images on a touch screen terminal to enable a user to select from multiple service functions, such as from a group that includes banking, bill paying, shopping, travel, gifts and information. The user interface generates displays for providing the user with an option from the group including transaction confirmation, error explanation, transaction repetition and user/provider voice communication.

The user interface interacts with a communications network for operating an account or conducting a transaction from a remote location. The present invention relates to a touch screen terminal at a remote location for sending and receiving communications, a service platform for processing the communications, and at least one provider of the account or transaction accessible by the service platform. The service platform includes an application processor with means for user selection of a category of services from a predetermined menu. A service provider can customize the menu of services for its users.

The terminal screen displays the data received from the service platform, which in a touch screen version includes virtual "buttons" touched by the user to continue the transaction as well as to provide directions for subsequent steps to perform the transaction. As referred to herein, a "button" is a relatively small area on the touch screen defined by a box or circle on a particular display of the present interface and which, when touched by the user, will initiate a request or cause a display to be shown on the screen. The flow of data from the service platform is managed to insure a rapid flow of screen displays on the terminal by prioritizing information that the user is most likely to use next. Once the transaction is completed, data about the transaction are sent to the service provider for logging.

In the present invention, a confirmation number is sent to the user's terminal when a financial transaction is successfully completed or an error message is sent to the user's terminal if a transaction is not successfully completed. The user can repeat a transaction or can be connected directly to a service representative upon request. If the user desires, a voice call, Telecommunications Device for the Deaf, generally known to the public by the historical acronym, and as consistently referred to herein as TDD or data transmission communication and a complete session log of the user's transaction sequence are sent to a customer service representative.

The user interface includes a security mechanism for preventing unauthorized access from the user interface to the network, including a user identification number, secret code and serial number of the terminal encoded in the transmission protocol from the user interface.

The present invention includes a method of providing services to a remote location. A user terminal for sending and receiving data communications is provided and interacts with a service provider computer for sending and receiving data communications. An intermediate service platform is operatively connected to the user terminal and the service provider computer. Requests for services from the user terminal are transmitted to the service platform which receives and processes the request and then sends the request for services to the appropriate service provider's computer. The service provider's computer then receives and processes the request for services in response to communications initiated from or sent to the user terminal and transmitted through the service platform. Responses from the service provider's computer, such as the generation of information and messages, are sent as a response to the user terminal. The response is displayed on the user terminal with instructions enabling the user to proceed with the request for services. Typical services provided include banking, bill paying, shopping, travel, flowers and gifts, and information.

The foregoing and other objects and advantages of the present invention will become more apparent when viewed in light of the accompanying drawings and the following description.

BRIEF DESCRIPTION OF THE DRAWINGS

FIG. 4 illustrates an embodiment showing a list of user's accounts;

FIG. 5 illustrates an embodiment showing the balance and overall status of an account;

FIG. 6 illustrates an embodiment containing information on an installment loan;

FIG. 7 illustrates an embodiment showing a user's most recent printed statement;

FIG. 8 illustrates an embodiment showing a list of accounts that the user can move funds from and to, along with an on-screen "form;"

FIG. 9 illustrates an embodiment showing a transfer confirmation number after funds transfer has been completed;

FIG. 10 illustrates an embodiment showing a stop payment "form" on a screen;

FIG. 11 illustrates an embodiment showing a list of the various types of accounts for which information is available;

DESCRIPTION OF THE PREFERRED EMBODIMENT

Figure 1:
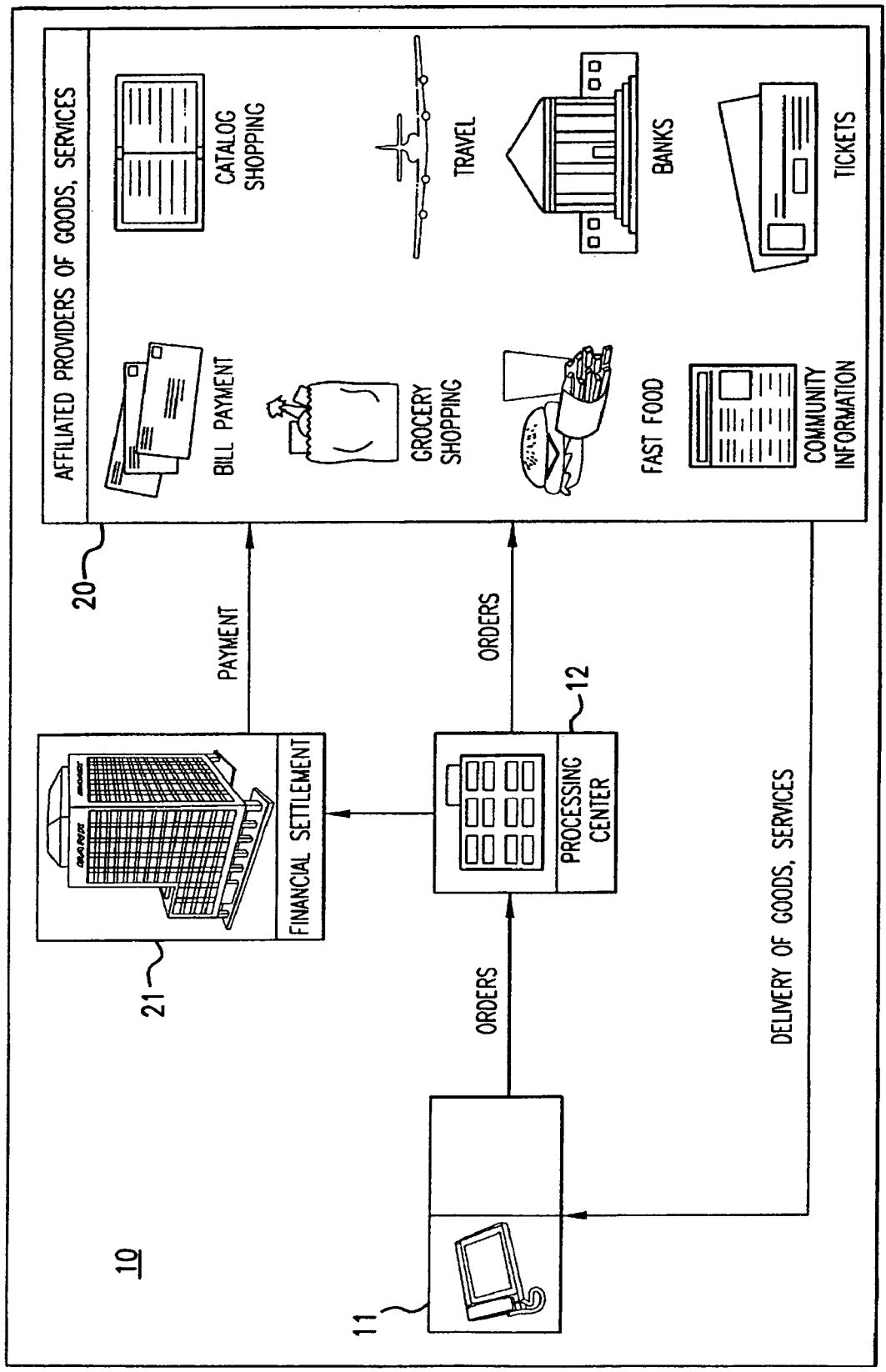
FIG. 1 is a general flow chart showing the interrelationship of the functional and operational components with which the present invention is associated.

In general, the present invention is a user interface for a communications network facility designed to provide access, presentation and gateway functions that allow financial institutions and service providers to receive, translate, process and send data between a user's terminal and their computer. The terminal may be any communication device that can receive and send electronic data communications, such as a combined telephone and modem device. The terminal is linked through telephone lines, X.25 packet or other public switched communication networks, to a service platform or network host, which translates protocol and relays the information onto the application processor or remote gateways for access to the service provider's computer.

The service provider's computer receives, translates, processes and responds to the user's commands and sends information back to the user through the network. All proprietary data are captured and retained on the service provider's computer. From the user's perspective, the service platform is invisible. Goods or services are delivered directly from a vendor, a financial institution or a service provider. When a user requests access to a service representative through the user terminal, the connection is made through the public switched telephone network to the service representative.

The service platform consists of a flexible hardware processing and application software environment governed by the UNIX operating system. The UNIX operating system is the resource manager supporting the multiple demands placed upon the service platform by multiple financial institutions and service providers. The service platform receives, translates, processes and sends data between a user's terminal and the computer of the service provider.

The present invention is a "user friendly" terminal interface. To access services, a user uses a "touch screen" which displays virtual buttons labeled with various functions, such as "Banking," "Bill Paying," "Shopping," and the like. When one of these buttons is touched, the terminal automatically dials the telephone number for the service platform using the public telephone network.

The interface responds to user requests, presenting the user with a choice of services. For example, a user who requests banking services chooses from a menu of specific services, including balance inquiry, transfers between accounts, transaction information, bill paying, and others. Directions appearing on the user's screen provide instructions for subsequent steps. To complete transactions requested by a user, the service platform accesses the computer of the service provider to obtain information regarding the user and the proposed transaction. Once the transaction is completed, the data are sent back to the computer for logging.

Access to services and information other than banking services is also provided by the terminal through the service platform. These services provided by affiliated organizations interconnected with the service platform include home shopping, entertainment and travel agents. To access these services, the consumer uses the terminal in the same fashion described above for financial services. The user interface shows the particular service provider's services and transactions. The service platform interfaces with the service provider's computer to access the requested information.

With the present invention, each service provider is able to customize the particular menus of services that it provides for its consumers. Users of the terminal are provided with three layers of security. Each transaction is identified by (1) a user identification number, (2) a secret code and (3) the serial number of the terminal. In this manner, user data are protected from unauthorized access, thus protecting the confidentiality and integrity of the data.

Referring now to the drawings, FIG. 1 is an overall flow chart showing, in general fashion, the interrelationship of certain functional and operative components of a communications network, generally designated 10, in which the present user interface may be employed. The services provided by the present invention operate through a combination of the capabilities of a telephone/modem or terminal 11 and a service platform or processing center 12, which will be typically owned and operated by the network provider.

Figure 1A:
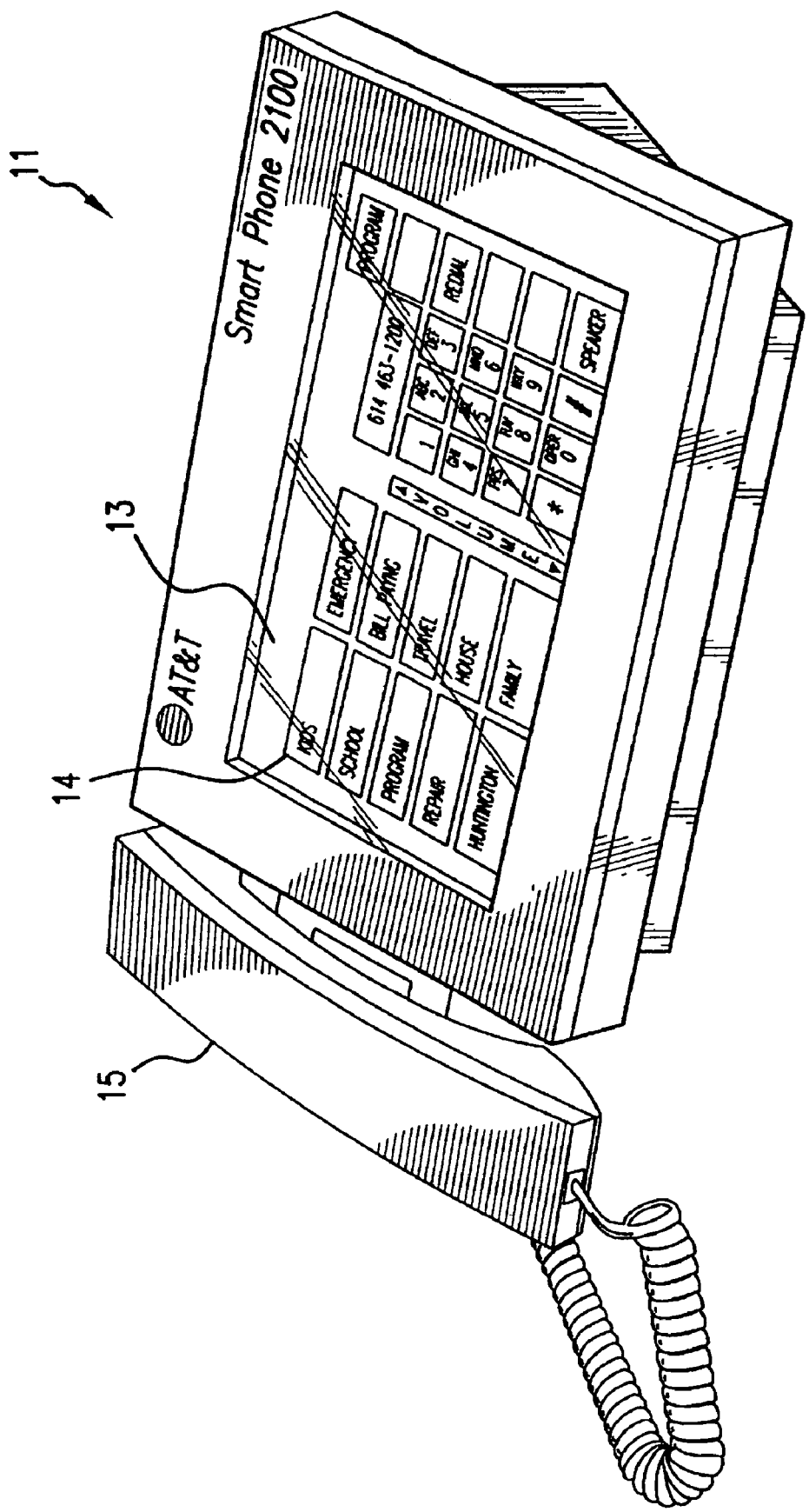
FIG. 1A illustrates an embodiment of a terminal used with the present invention.

FIG. 1A is an embodiment of a terminal 11 that may be used with the present invention. The terminal 11 is a combined telephone and modem that features a touch-sensitive liquid crystal touch screen display 13 with "buttons" 14 that the user touches to access services. The interactive touch screen display 13 is the user accessible aspect of the terminal interface with the service platform. Although a touch screen is the present preferred embodiment, the invention is adaptable to other technologies, such as audible read-out, voice-recognition, optical remote control, and the like. The terminal 11 may include a telephone handset 15 for voice communications. The terminal also includes a microprocessor that is internally programmable to provide the user interface displayed on the screen and to interact with the service platform through modem communications according to protocol determined by the network provider for the service platform. The terminal also includes permanent and active memory for storage of the operating program and displays and for recording user input data, such as names, account identification, security codes and the like on display (or information) templates, and for recording a sequence of user choice selections for a historical record, or for use when a service representative is called or required. Source code for a representative program useful with an AT&T Smart Phone™ telephone/modem terminal is included at Appendix A, pages 2 through 73 filed with application Ser. No. 08/254,146.

Thus, the user interface, in combination with the terminal 11, processes information in organized flows which provide access to a variety of information. In addition, the present user interface and the terminal 11 manage the flow of information from the service platform 12 to insure a rapid flow of "screens," prioritizing information the user is most likely to use next, based on the principles of human factors engineering. A sequential paging function in the flow of screens enables users to scan through descriptions of products and services. The paging display is essentially instantaneous because the terminal temporarily stores the relevant information retrieved from the service platform.

The UNIX system in the service platform 12 serves as the "manager" of all outside resources and coordinates a number of functions including scheduling and executing processes, performing inputs and outputs, handling interrupts, managing storage and monitoring the system. As such, UNIX communicates between the various types of computer hardware systems in place at a participating financial institution and any of a number of participating providers of goods and/or services 20. This flexibility enables the participating financial institution 21 and the service providers 20 to use existing computers to connect to the service platform 12 to offer products and services to users.

Typically the participating financial institution 21 interacts with the user by making the users accounts available for informational and/or transactional purposes. The financial institution 21 is connected to the service platform 12 via one or more data and voice lines. Once the user sends the appropriate command, via the terminal 11 to the service platform 12, the user is then connected via a high-speed data transmission line to the computer of the financial institution 21 or other service provider 20. When a user initiates a transaction on the terminal 11, the service platform 12 relays the information to the financial institution's computer, instructing it to execute that transaction for the user. A connection to the service platform may also be provided using various X.25 packet assembler/disassembler equipment in a public or private network with the same functionality. A conventional software application environment connects the financial institution's computer 21 to the service platform 12 and also drives the terminal operation for users. Application development software packages may be customized to provide terminal users access to particular services and to optimally match the financial institution's banking service features and functionality. Bill paying services and related programming may be provided on a turnkey basis for both terminal and voice-response applications.

When a terminal user successfully completes a financial transaction such as a debit or credit to an account, a confirmation number appears on the screen 13, indicating the completion of the transaction. If the transaction was not completed successfully, an "error" message will appear, instructing the terminal user concerning the reason the transaction was not completed. At this point, the user may choose to repeat the transaction or contact a service provider's customer service representative for clarification and assistance.

For example, if the user were in the travel services menu, the service platform 12 would automatically launch a voice or TDD call to the travel agency's customer service department. A complete "session log" of the user's step-by-step transaction sequence as recorded in the memory of the terminal is immediately sent by the service platform to the service provider's customer service representative to assist in resolving the terminal user's inquiry. The service platform 12 also provides back-up customer service when the financial institution cannot directly resolve a customer inquiry while terminal users are linked to the selected service through the service platform 12. This link is "invisible" to users, who thus perceive their selected provider as offering the service.

The present interface presents the user with a number of options that are available with each of the services. The common options relate to security/identification, confirmation of transaction, error explanation, repetition of transaction, and customer service voice or TDD communication. These common options, as well as the options which are associated with a particular service, are presented as graphic and alphanumeric images on the terminal screen 13.

I. Sign-On

The user at sign-on is required to provide identification and other details before access to an account or other transaction is provided.

Users access terminal services by entering their user ID, which they keep confidential as a security precaution. PIN encryption with a secret code may also be used, thus providing another safeguard for terminal users. The service platform also provides an additional level of security by recognizing the unique identification of each terminal.

Figure 2:
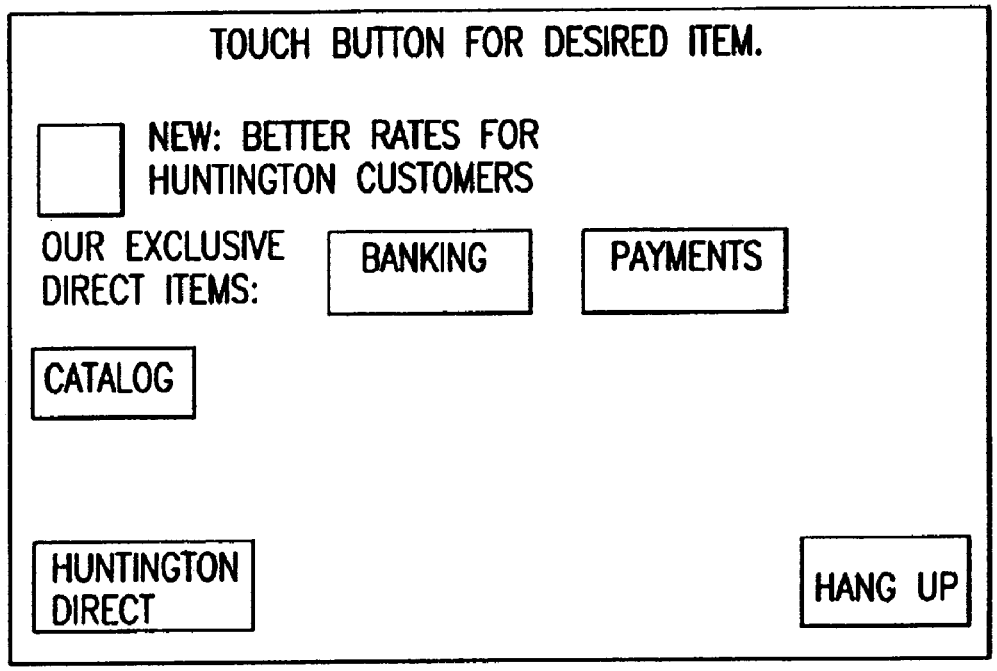
FIG. 2 shows an embodiment of a main menu of the present invention.

After accessing the terminal, users view a main menu, such as shown in FIG. 2, from which service options such as banking, shopping, and bill paying may be selected.

II. Banking

Figure 3:
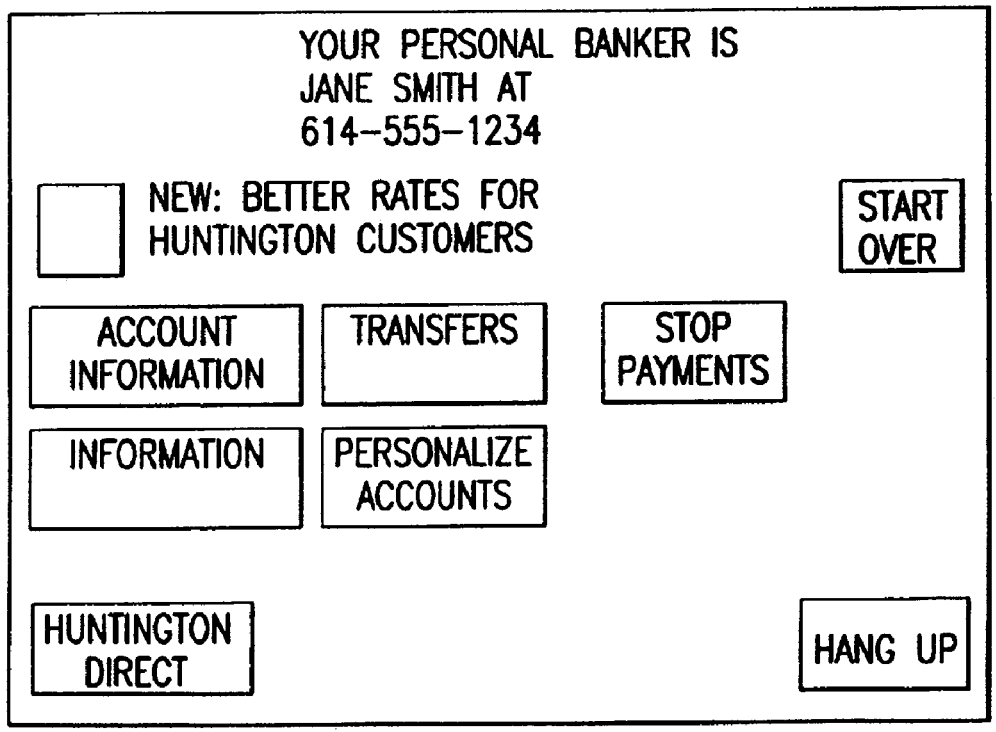
FIG. 3 shows an embodiment of a customized menu of the present invention.

When "Banking" is touched on one of the "sign-on" menu screens (FIG. 2), a menu of banking services, FIG. 3, appears on the screen.

The basic menu includes:
Account Information,
Transfer,
Stop Payment,
Information and
Personalized Account.

This latter feature allows users to name an account (for example, "Mike's Checking," "Jan's Checking") to distinguish various accounts.

A customized menu tailored to the offerings of a particular banking provider may also be developed.

After a choice from the menu is selected, for example, when a user touches the "Banking" button appearing on the screen, the service platform retrieves a user profile stored in the financial institution's computer. This profile will usually include the user's name, listing of accounts and balances, and other basic data. The profile is stored in the service platform during the banking session to insure smooth and rapid flows of information.

As the banking session proceeds, the service platform/processing center (12 in FIG. 1) moderates the flow of information between the user's terminal and the financial institution's computer. If account information that is more detailed than that included in the user profile is needed, the service platform accesses the financial institution's computer to retrieve the necessary data.

If a user desires to know the balances of various accounts, he or she chooses the "Account Information" service from the banking menu (FIG. 3). Next, a list of user's accounts appears on the screen, including checking, savings, CD's, money market accounts, installment loans and other. The accounts may be listed by number or by a name as chosen by the user. Each account will have a button beside it, as shown in FIG. 4.

Once the user chooses the account to review, the balance and overall status of that account appears on the screen. An example of this screen is shown in FIG. 5. The type of information will vary according to the type of account. For example, for a checking account, the information includes the balance, last statement date, interest received and checking reserve available (overdraft protection). By comparison, the information on an installment loan includes: loan amount, balance, term, maturity date, collateral and next payment date. An example of a screen containing the information on an installment loan is shown in FIG. 6. The user may make payments on the installment loan through the bill paying service of the present invention.

By touching the button marked "Latest Transactions" at the top of the screen shown in FIG. 5, the user can review account history. The amount and type of information available varies according to the type of account. For example, by touching "Latest Transactions" for a checking account, a user can review all transactions since the last statement. By next touching "Last Statement," the user can review the most recent printed statement received, as shown by the example of FIG. 7.

The user has the option to move back and forth between the "Latest Transactions" and "Balance and Status" screens at any time. To exit "Account Information," the user either touches "DONE" at the end of a transaction, which returns the screen to the Banking menu, or the user touches "Start Over," which returns the screen to the main menu.

A user may also transfer money between accounts by pressing the "Transfer" button in the Banking menu. Next, the screen will feature a list of accounts that the user can move funds from and to, along with an on-screen "form" which asks "From Account," "To Account," and "Amount," as shown in FIG. 8. Once the user fills out the form using the subject display, the next display will request a confirmation. To do so, the user presses "DONE." The next display, FIG. 9, provides a transfer confirmation number, which the user should enter into a check register. When the user touches "DONE" again, the screen returns to the banking menu.

With reference to FIG. 10, if a user needs to stop a payment, the appropriate display prompts the user to specify the account. Next, the display provides a message explaining the fee for the service. The present interface prompts the user to complete a "form" on the screen which includes the check number and, if possible, the dollar amount and the reason. Once the form is complete, the user presses the "DONE" button and the request is entered. The screen next provides a disclaimer about the terms and conditions of the transaction, explaining that the stop payment order will be placed within 24 hours and that the stop payment cannot be enforced if the check has already been cashed. When the user again presses "DONE," the screen returns to the banking menu. Upon registration of the stop payment instruction at the financial institution, the user will receive via mail a form from the institution which must be completed and returned to confirm the stop payment order. The same procedure is necessary if the stop payment order is made verbally over a conventional telephone.

Figure 12:
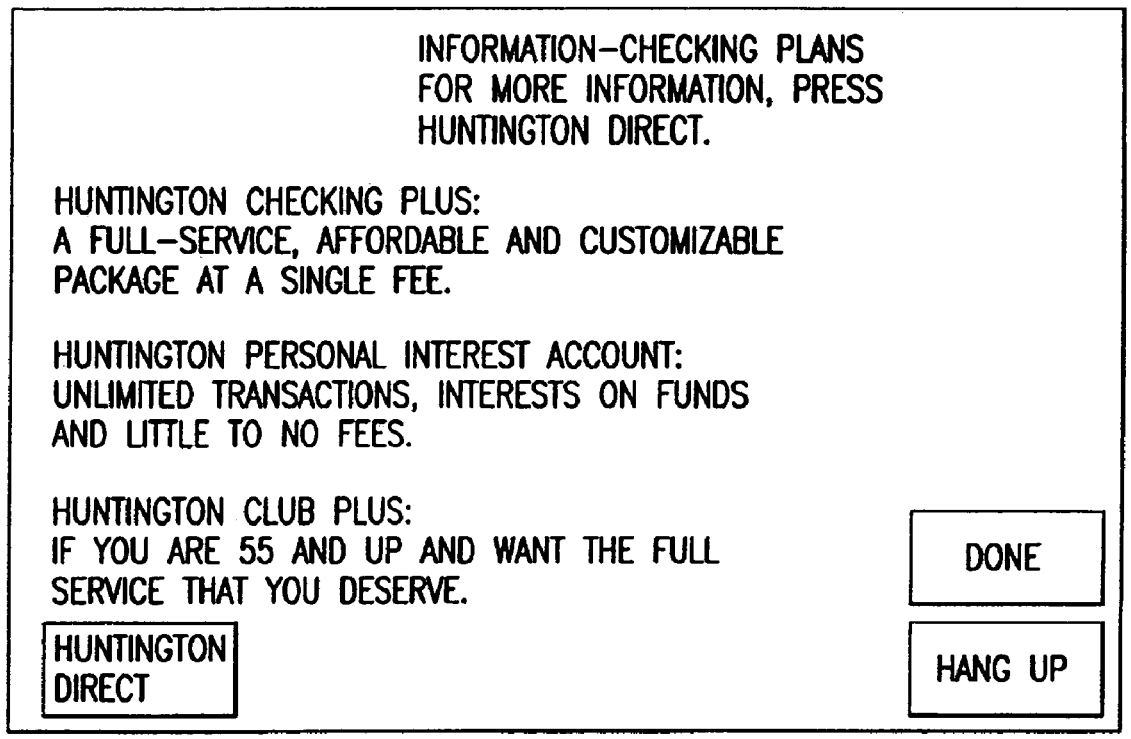
FIG. 12 illustrates an embodiment showing a page of text with information about accounts.

Users can review an electronic "catalog" of the financial institution's products and services by pressing "Information" on the main banking service menu (FIG. 3). The information appears in pages of text, which the user can scan by "paging through" the material. FIG. 11 shows the first screen which lists the various types of accounts for which information is available. The terminal and service platform are designed to manage the flow of multiple pages of text so that moving from page to page is easy and essentially instantaneous. An example of a page of text is shown in FIG. 12. If a user wishes to open an account, he or she presses the "Huntington Direct" button and is connected by voice, TDD or data transmission communication to a customer service representative. The customer service representative will open the account, as requested. This voice, TDD or data transmission communication option may be chosen from any screen or menu.

Figure 13:
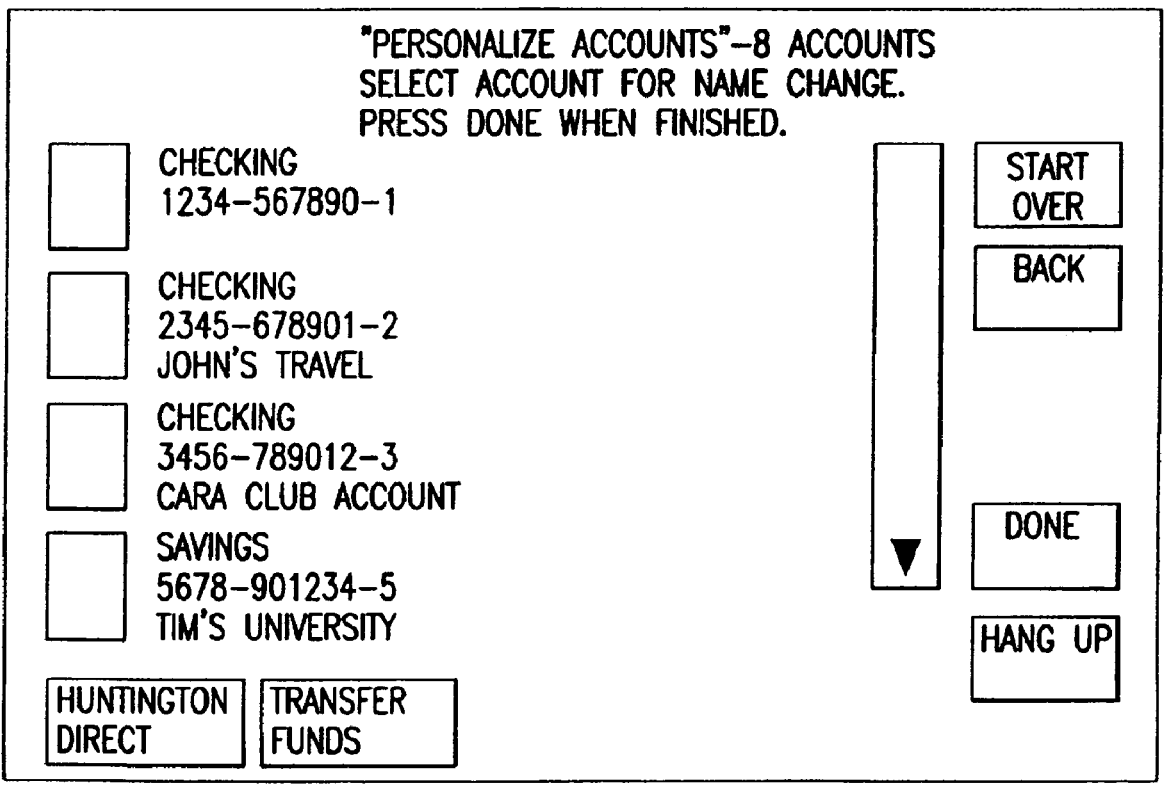
FIG. 13 illustrates an embodiment showing a user's personalized account.

The programmable aspect of the user terminal also allows users to personalize the name of accounts for easy recall. For example, different savings accounts might be labeled "Eric's College Fund" or "Vacation Account." After an account is personalized, the detailed information regarding these accounts can be accessed by the user. If a user wants to personalize his or her account, he or she presses the "Personalized Accounts" button, and a list of all accounts appear on the screen (FIG. 13). Next, the user touches a button beside the account to create a customized name. A "keyboard" appears on the screen asking the user to enter the new name for the account. The user enters the information and the terminal asks for a confirmation. When the user presses "DONE," the screen returns to the list of accounts and the new personalized name appears on the screen. Once the user confirms the name, it appears under the user-selected name whenever that account appears on a terminal menu. If the user wishes, the personalized name appears on printed statements. When the user presses "DONE" again, the screen returns to the banking menu.

When a user pays a bill using the terminal bill paying service, the bill paying service asks the banking service to verify if there are sufficient funds. Further, the bill paying service updates the user's information in the computer when a bill is paid. The transaction is memo posted so that the funds are not available. The user will see the updated balance on the terminal on the morning after the next business day.

In accordance with the present invention, on nearly every screen, the user has the opportunity to press a button to reach a customer service representative from the user's financial institution. Once the user confirms the request for personal service, the banking session ends, the data link to the service platform terminates, and the service platform dials the financial institution's customer service center.

III. Bill Paying

Figure 14:
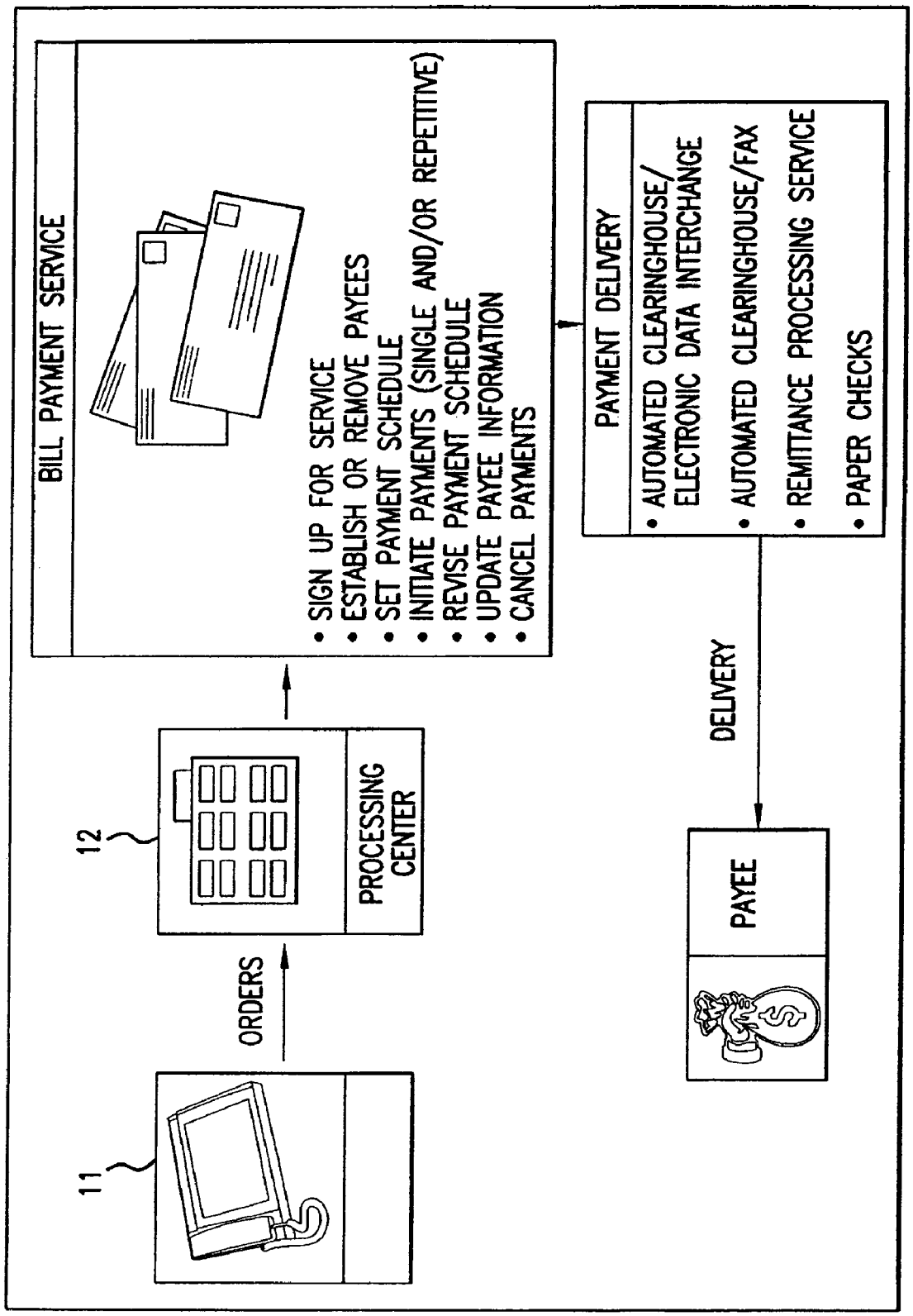
FIG. 14 is a flow chart of the bill paying operations of the present invention.

The user interface offers different access methods including terminal and automated voice response (AVR) applications accessed using conventional telephone networks. FIG. 14 is an overall flow chart of bill paying operations. When the bill paying service is accessed by the terminal, access to the service platform processing center is similar to that stated above, with the user accessing the system with an account number and PIN. Access procedures for voice response users are determined by individual financial institutions. Voice response users may access the bill paying service through the service platform using a regular touch tone telephone, rotary dial telephone, or voice recognition technology. Many of the advanced features of the service platform bill paying service are available to voice response users as well as to users using a terminal. Financial institutions may choose to offer both AVR and terminal access so that customers can access bill paying capabilities in either mode.

The system architecture of the service platform allows users to move from service to service without re-entering their identification number and PIN. Once the terminal user accesses the bill paying function, the following procedures occur:

(1) The service platform communicates with the computer of the user's financial institution to identify the terminal user's profile, which includes payees and accounts.

(2) The user may add, delete or change payees, schedule, reschedule or cancel future payments, or inquire about previously made payments.

(3) Each time a payment is made or a payee is added or modified, the information is sent to the service platform. The user is provided with a confirmation number for financial transactions, which serves as a "receipt."

(4) Upon completion of all bill-paying transactions, the terminal user touches "DONE" and the platform terminates bill-paying activities. The user is returned to the main services menu display, where they can choose additional services. When "DONE" is touched again, all transactions are completed.

To establish the electronic bill paying service, terminal users that are customers of a financial institution sign up for bill paying services using their terminal display. Voice response users follow procedures established by their financial institution, using the mail or conventional telephone. Terminal users can add, delete and change information regarding businesses which participate in electronic bill-paying, without the need for access to a customer service representative. Users can make payments to any individual or business, meaning that their electronic transactions will serve as a complete "checkbook." After each payment, users are provided with a confirmation number which serves as a receipt. Terminal users will see the number on their display, while voice response users will hear the number.

Users can set up, change or delete a schedule of recurring payments for the same amount and account on a specific date. Users can receive information on the last two payments made to each payee, either by terminal display or voice response. Furthermore, users can view their personal list of payees at any time.

The service platform bill paying system offers functions and services which enhance user convenience. These include:

(1) Payee Subtitle. Users may establish a personalized subtitle for each payee, such as separate credit card accounts for spouses with titles such as "Credit Card, Liz," and "Credit Card, Andy." Terminal users may establish such subtitles using their screen. Voice response users can call or write their financial institution.

(2) Instant Payee Startup. Through a selected display in the present interface, a user may establish a new participating payee and immediately authorize a payment.

(3) Payee Search. This terminal function enables users to view a master list of participating payees and quickly punch an access code for convenient access to frequently used payees.

(4) Payee Search-by-Category. This function permits users to view participating payees in pre-defined categories (utilities, credit cards, etc.). This is useful when establishing new payees in a user's personal list.

(5) List of Upcoming Payments. Users have access to present and future scheduled payments, either via terminal display or voice response listing.

(6) Multiple Funding Accounts. All users are able to debit any of their accounts even at different financial institutions to fund payments. This flexibility simplifies finance management.

(7) Expected Funds Delivery Date. Each transaction confirmation includes the average number of days before the payee receives the appropriate funds, based upon the remittance method used.

The service platform bill paying system uses electronic networks whenever possible to make payments convenient for the payee and the user. Typical networks available include:

(1) Automated Clearinghouse and Electronic Data Interchange (ACH/EDI) using the automated clearinghouse to send debits and credits, with remittance information transmitted in EDI format;

(2) Automated Clearinghouse Facsimile (ACH/Fax) which will also send a credit via the ACH system and send remittance information to payees via fax; and (3) MasterCard's Remittance Processing Service (RPS) that allows electronic transmissions of payments and remittances to be delivered to an already established payee base. Other methods may be added to provide flexibility to the financial institution to customize a package which meets local needs. For example, a major local department store could set up an automatic payment account. Whenever electronic means cannot be used, the bill paying system creates paper checks and mails them to payees.

The electronic bill paying portion of the service platform may be driven by a customized version of Personal Transaction Teller (PTT), a bill paying software package that is proprietary to The Huntington National Bank, Columbus, Ohio, or other appropriate types of bill paying software packages. In addition, the financial institution's customer service representative will have immediate access to bill paying information, in many instances enabling representatives to resolve inquiries while the user is on the telephone. The service platform maintains records of, and reports the standards of customer service to the financial institution on a regular basis. Measurable service standards that are monitored and reported include total time of error resolution, total number of user inquiries, and ratio of problems to total transactions.

IV. Shopping

The present interface allows terminal users to enjoy the convenience and control of shopping with participating suppliers at home, 24 hours a day, 7 days a week. Users of the system are provided with catalog shopping services. The "catalog" is a data base organized by product categories and types, enabling users to shop for items by department, as they would if they were in a major department store. The data base is updated frequently to incorporate the most popular items for terminal users. Examples of the type of merchandise available through the catalog shopping service are electronics, appliances, toys, luggage, home furnishings, jewelry, and the like.

Figure 15:
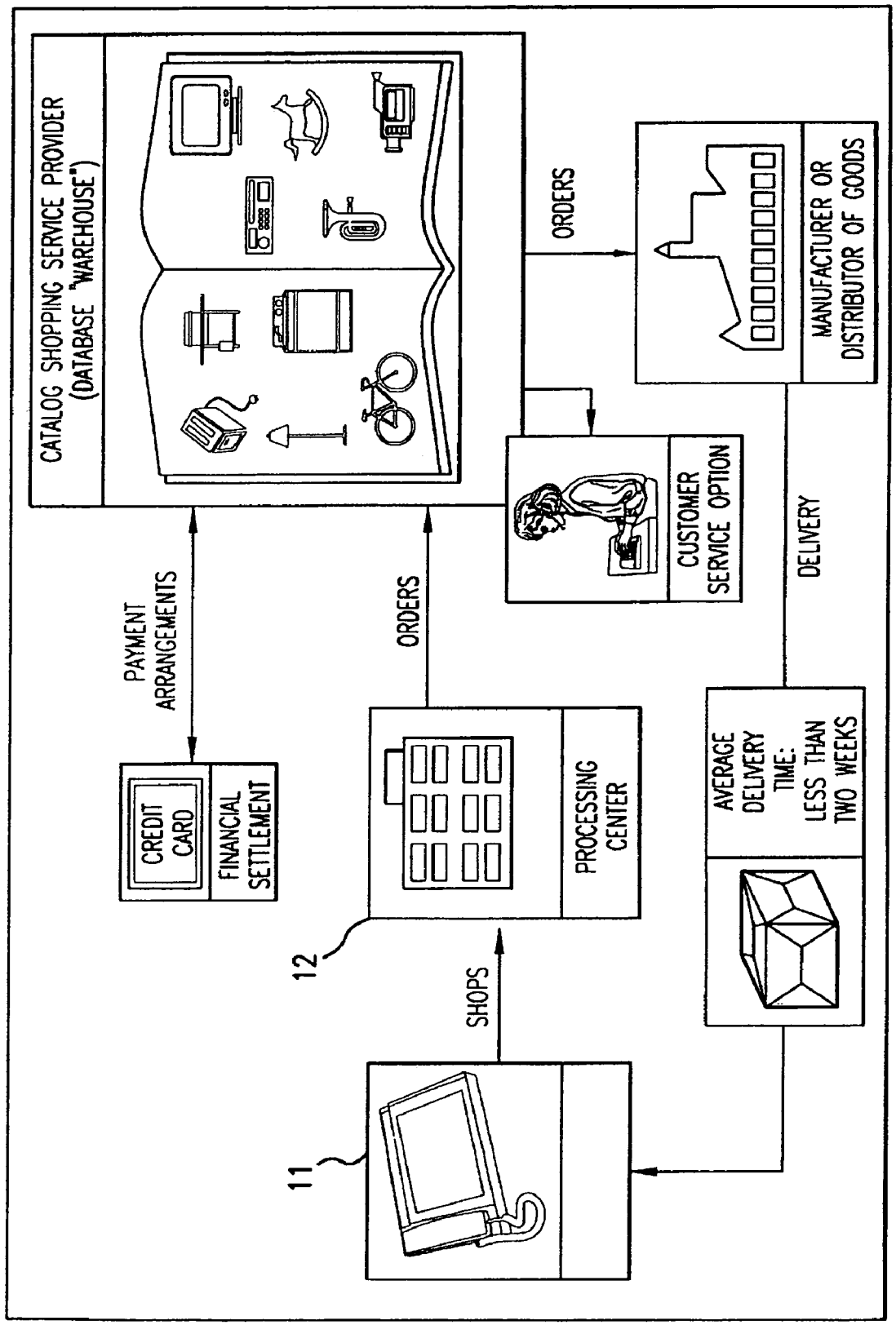
FIG. 15 is a flow chart of the shopping service operations of the present invention.

As illustrated in FIG. 15, the terminal user accesses the catalog shopping service through the service platform. Using the appropriate displays of the present interface, users are guided through the shopping options by on-screen directions. As the terminal user touches buttons on the screen, the service platform routes information, enabling users to make price comparisons and order the latest merchandise quickly and easily. Terminal users use the catalog shopping services by following the procedures outlined below.

(1) Select "Catalog Shopping Service." From the main shopping display menu, the user selects "Catalog Shopping Service."

(2) Choose Shopping Option. The terminal user chooses from three options:

(A) "Best Buys" Category. Users can shop for merchandise by browsing through the service's most popular product categories. Upon entering "Best Buys," the display prompts users to select a category of merchandise, such as "Stereo Equipment." The next step is a selection of a specific type of product within those categories, such as "Cassette Players" or "Portable Radios." Once the selection is made, the user views a choice of manufacturers and models. The user can "page through" listings, which include a brief description, manufacturer's suggested list price, the price available to terminal users, and the cost savings associated with making the purchase through the service platform. Further, the user can access more detailed product descriptions by touching the appropriate "button." Once the user has made the selection, the order is placed directly from the "Best Buys" category.

(B) Order by Model Number. Comparison shoppers, who have researched the product and know its brand name and model number, can enter the model number to retrieve the product's catalog listing. The listing states the manufacturer's suggested list price compared to the price available to terminal users.

(C) "What's New?" This terminal feature informs users of new merchandise available through the catalog service.

Other shopping options may allow users to select a specific manufacturer, price range or product feature and review all products included in the catalog which fit the user's needs.

(3) Order Merchandise and Arrange for Payment and Delivery. Once the purchase decision has been made, the terminal user presses "Order This," along with the product identification number, price, quantity, size, color and other specifications as appropriate. When prompted for payment, the user enters his or her credit card number and expiration date. The service platform verifies the information to insure the card number is valid. When the user places an order, the service platform retrieves basic user information from the financial institution's computer, such as name, address and telephone number, for billing and shipping purposes. The user confirms the order and shipping/billing information as prompted on the screen display and the order is placed. Most merchandise orders are sent instantaneously via electronic data interchange to the appropriate participating vendor that ships the order in accordance with instructions provided by the user through the terminal interface.

(4) Exit Shopping Service. Upon completion of the catalog shopping transaction, the terminal user touches "DONE" on the screen and the platform terminates the catalog shopping activities. Then the user is returned to the main services menu display.

At any time while shopping through the terminal, the user can choose to speak to a customer service representative of the catalog service provider by touching the appropriate screen button. This disengages the on-screen shopping session and automatically dials the catalog vendor's service department. The user can then inquire about the status of an order, check on the availability of items or receive assistance in locating an item.

Catalog shopping requires the same access to the service platform established with bill paying or banking services.

V. Travel

Figure 16:
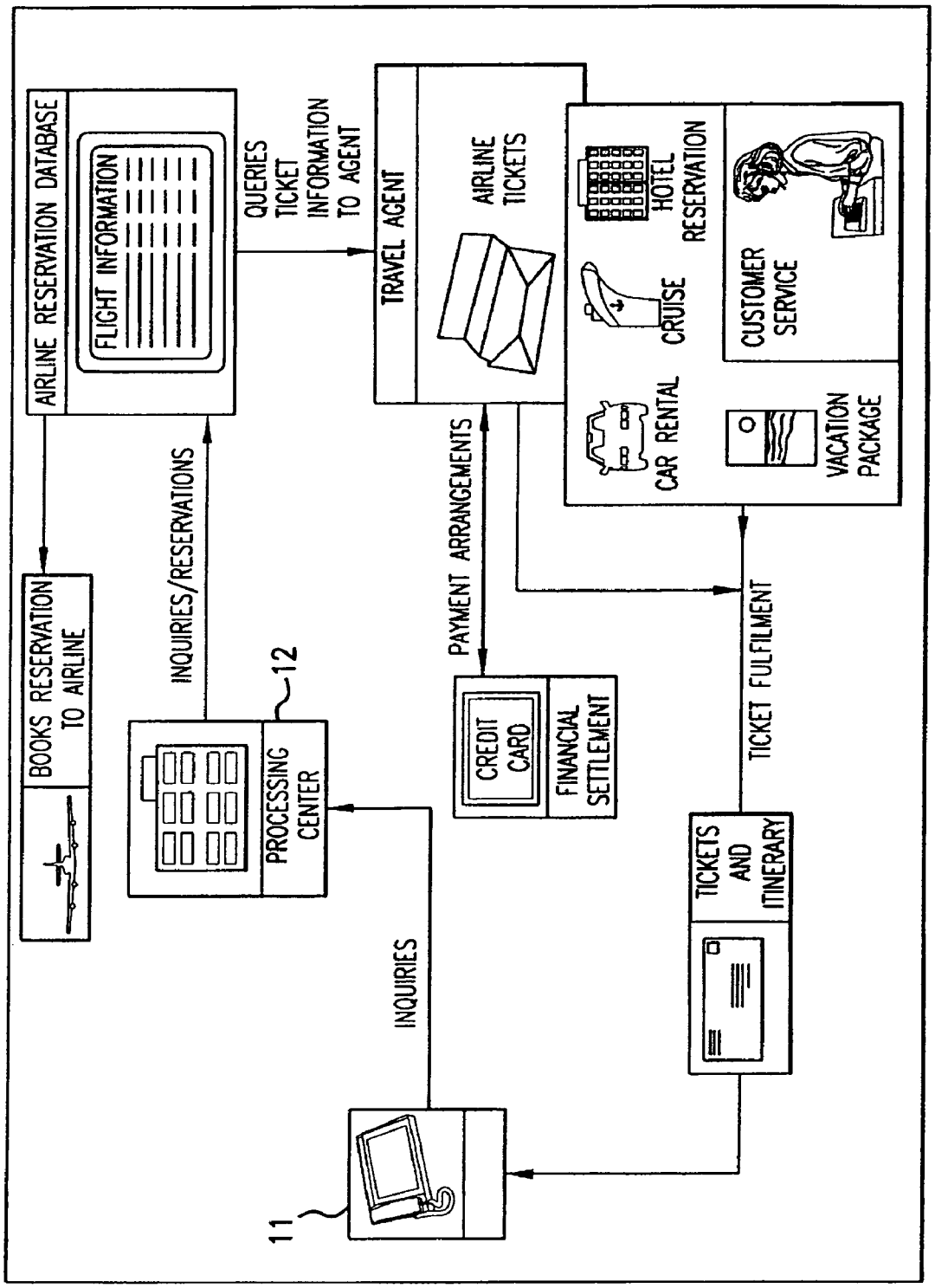
FIG. 16 is a flow chart of the travel service operations of the present invention.

FIG. 16 is a general flow chart of the travel service operations of the present invention. Airline reservations and other travel services are available through the present interface.

The service platform provides a link between the terminal user and an airline reservation system. The participating service provider travel agency handles ticket fulfillment and customer service. Users can make domestic airline reservations directly, without contacting a customer service representative or travel agent, thus the result will be increased consumer control and convenience. To arrange a flight, the user: (1) selects the displayed menu button to access "Travel" services; (2) enters the city of departure using the display relating thereto; 3) enters the destination; and 4) enters the desired date and time of departure or arrival.

The interface will ask questions necessary to clarify any ambiguities. For example, if the user enters "Columbus," the screen will ask "Columbus, Ohio or Columbus, Ga.?" The user will provide the same information regarding the return trip. The service platform uses this information to access an airline reservation data base which contains domestic flight information. The service platform gathers information on all available flights which meet the user's specifications, and the present interface displays them on the user's terminal screen.

A user can establish a travel profile through the present interface that includes basic information such as seating preference and frequent flyer account numbers. This enhances convenience by allowing the user to bypass routine booking information.

The interface also prompts the user regarding the need for hotel or car rental reservations for the trip. These arrangements can be made by touching an appropriate screen button. Cruise and package vacations also can be booked by connecting directly to the service provider's travel consultants. Once the user has made final choices, the interface to the reservation system books the reservation and queues the ticket to the service provider travel agency, who mails or delivers the tickets to the user.

VI. Flowers and Gifts

The present interface may provide the user with the ability to send flowers and other items to designated recipients, along with standard or original messages. Displays are provided for entering the name and location of the recipient. Additional displays are provided for selecting the desired type and quantity of flower or other gift. Pricing and availability, and shipping information are also provided by the present interface. Order review, order confirmation, billing information, credit card information appear in sequential fashion.

The present invention may also be used in conjunction with commercial applications that include services for businesses. These services may include general banking services such as bill paying, an "electronic checkbook," payroll applications, credit and loan-related services, investment services, tax services, information services such as credit bureau information, reference services, and a community calendar.

Entertainment services can be provided which enable the terminal user to order a wide range of items such as event tickets, flowers, and make restaurant and hotel reservations.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A system for accessing an account, conducting a transaction, obtaining one of several services, or obtaining information over a network, said network including a user operable terminal in the form of a telephone for sending and receiving communications at a remote location relative to a provider of the account, transaction, service, or information to be accessed and a gateway service platform for processing and transmitting said communications to and from the user operable terminal and to and from at least one provider of the account, transaction, service, or information, said system comprising:

said terminal having a display of user selectable options perceptible to the user that are changeable in accordance with differing modes of operation of the terminal and having an internal processing unit programmed to provide a multiplicity of selectable options with respect to the account, transaction, service, or information, said terminal being capable of registering the user's input to the terminal corresponding to the user's selection from the multiplicity of selectable options;

data transmission means for communicating the user's selection from among the multiplicity of selectable options presented by the terminal to the service platform and for communicating data from the service platform to the user terminal;

data receiving means enabling the user terminal to display data concerning the account, transaction, service, or information received from the service platform in response to the user's selection from the multiplicity of selectable options;

means for maintaining in the user terminal a record of connectivity interconnections associated with predetermined providers of each account, transaction, service, or information displayed;

means for connecting the user terminal through a connectivity interconnection to the provider in response to the user's selection from the multiplicity of selectable options; and means for enabling the user to communicate with the provider upon connection with the provider of said account, transaction, service, or information comprising a switch initiating an interconnection with and data communication between, the user terminal and the provider through the service platform wherein, upon connection of the user to the provider, the display of user selectable options on the user terminal is ended and the user terminal becomes interconnected with the selected provider to access the user account, transaction, one of several services, or information.

2. The system of claim 1, wherein, when the provider of said account, transaction mechanism, service, or information is accessed by said user, a response of the provider comprises a display on the user terminal of user selectable options offered by the provider in response to the user selection from the multiplicity of preprogrammed choices and the response of the user thereto is communicated to the provider whereupon the user selection is fulfilled.

3. The system of claim 2, wherein the display presented to the user from the provider is in the form of selectable text indicia.

4. The system of claim 3, wherein the display of selectable indicia is a plurality of options displayed in a fixed menu.

5. The system of claim 3, wherein the display of user selectable indicia is a plurality of options displayed in a fixed menu.

6. The system of claim 1, wherein the user terminal includes user operable physical touch buttons on the telephone.

7. The system of claim 1, wherein each of said services are a user selectable option and upon the user's selection of one of said services, the provider (1) communicates data to the user terminal of said service (2) provides the user with access to said data; and (3) enables the user to view and select an option from the group comprising: (a) browse through service categories, (b) view said data by type of service; and (c) view data regarding said selected service.

8. The system of claim 7, wherein one of said services are merchant services and the selectable option from the group comprises selecting a product for purchase whereupon the provider displays to the user a menu requesting payment information from the user.

9. The system of claim 8, wherein the menu requesting payment information from the user provides means for enabling the user, through an interconnection with the provider of the service, to enter a user indicia and password whereupon a debit is initiated with respect to charges incurred as a result of a transaction with the provider; and receive a confirmation following successful completion of the transaction with the provider.

10. The system of claim 1, wherein the display presented to the user from the provider is in the form of one or more graphic icons.

11. The system of claim 1, wherein when the user terminal becomes interconnected with the selected provider, the provider responds to the user terminal with a menu display of user selectable choices.

12. The system of claim 1, wherein the record is an historical record.

13. A method of accessing an account, conducting a transaction, obtaining one of several services, or obtaining information with a user interface for a communications network, said communications network including a user operable terminal for connecting with and sending and receiving communications at a remote location relative to a provider of the account, transaction, service, or information and a gateway service platform for processing and transmitting communications to and from the user operable terminal and to and from at least one computer associated with the provider of the account, transaction, service, or information, said method comprising:

providing, on said user operable terminal a touch screen display of virtual buttons that are changeable in accordance with differing modes of operation of the terminal;

providing an interconnection from the user operable terminal through said gateway service platform for processing and transmitting communications to the provider of the account, transaction, service, or information;

providing, via programming in an internal processing unit in the terminal, a multiplicity of preprogrammed choices represented by different displays of virtual buttons with respect to the account, transaction, service, or information, said multiplicity of preprogrammed choices being perceptible to the user on the touch screen;

maintaining in the processing unit of the user terminal a record of connectivity interconnections associated with predetermined providers of each account, transaction, service, or information displayed;

registering in the terminal the user's input corresponding to the user's selection from the multiplicity of preprogrammed choices displayed on the touch screen;

communicating through a connectivity interconnection from the terminal to the service platform the user's selection registered as the user's input from the multiplicity of preprogrammed choices and for connecting the user terminal to the provider in response to user selection from the multiplicity of programmed choices; and enabling communication between the user and the provider upon the user's selection from the multiplicity of preprogrammed choices, by way of a switch initiating an interconnection with and data communication between the service platform and the user terminal, wherein, upon connection of the user to the provider, the display of programmed choices on the user terminal is ended and the user terminal becomes interconnected with the selected provider to access the user selected transaction, service, or information.

14. The method of claim 13, wherein, a response of the provider comprises a display on the user terminal of user selectable options offered by the provider in response to the user selection from the multiplicity of preprogrammed choices and the response of the user thereto is communicated to the provider whereupon the user selection is fulfilled.

15. The method of claim 14, wherein the display to the user from the provider is in the form of selectable text indicia.

16. The method of claim 14, wherein, the response of the provider comprises a display on the user terminal of merchant offerings by the provider, and upon the selection of an offering by the user, a display on the user terminal from the provider requests payment information prompting the user to enter identifying indicia whereupon a debit is initiated with respect to the user as a result of a transaction with the provider; and a confirmation following successful completion of the transaction with the provider is sent.

17. The method of claim 16, wherein the debit is entered into a credit system with which the user and provider are associated.

18. The method of claim 14, wherein each of said services are a user selectable option and upon the user's selection of one of said services, the provider (1) communicates data to the user terminal of said service (2) provides the user with access to said data; and (3) enables the user to view and select a further option.

19. The method of claim 18, wherein the provider displays to the user terminal a menu requesting payment information from the user and enables the user, through an interconnection with the provider of the service, to enter a user indicia and password whereupon a debit from the user is initiated into a credit system with which the user and provider are associated with respect to charges incurred as a result of a user transaction with the provider.

20. The method of claim 13, wherein the user terminal is a phone.

21. The method of claim 13, wherein the display to the user from the provider is in the form of one or more graphic icons.

22. The method of claim 13, wherein a response of the provider comprises displaying on the user terminal a menu of user selectable options.

23. The method of claim 13, wherein the record is an historical record.

24. A system for at least one of accessing an account, conducting a transaction, obtaining one of several services, or obtaining information over a network, said network including a user operable terminal in a form of a telephone for sending and receiving communications at a remote location relative to a provider of the account, transaction, service, or information to be accessed and a gateway service platform for processing and transmitting said communications to and from the user operable terminal and to and from at least one provider of the account, transaction, service, or information, said system comprising:

said user operable terminal having a display of user selectable options perceptible to the user that are changeable in accordance with differing modes of operation of the user operable terminal and having an internal processing unit programmed to provide a multiplicity of selectable options with respect to the account, transaction, service, or information, said user operable terminal being capable of registering user input to the user operable terminal corresponding to user selection from the multiplicity of selectable options;

data transmission apparatus that communicates the user's selection from among the multiplicity of selectable options presented by the user operable terminal to the service platform and for communicating data from the service platform to the user operable terminal;

data receiving apparatus that enables the user operable terminal to display data concerning the account, transaction, service, or information received from the service platform in response to the user's selection from the multiplicity of selectable options;

apparatus that maintains in the user operable terminal a record of connectivity interconnections associated with predetermined providers of each account, transaction, service, or information displayed;

apparatus that connects the user operable terminal through a connectivity interconnection to the provider in response to user selection from the multiplicity of selectable options; and apparatus that enables the user to communicate with the provider upon the user's selection from the multiplicity of selectable options of an account, transaction, service, or information comprising a switch initiating an interconnection with and data communication between, the user operable terminal and the provider though the service platform wherein, upon connection of the user to the provider, the display of a multiplicity of selectable options on the user operable terminal is ended and the user operable terminal becomes interconnected with the selected provider to access the user selected account, transaction, service, or information.

25. The system of claim 24, wherein, when the provider of an account, transaction mechanism, service, or information is accessed by a user, response of the provider comprises a display of user selectable options offered by the provider in response to the user selection from the multiplicity of preprogrammed choices and response of the user thereto is communicated to the provider whereupon the user selection is fulfilled.

26. The system of claim 25, wherein a display is presented to the user from the provider in the form of selectable text indicia.

27. The system of claim 26, wherein the display of selectable text indicia is a plurality of options displayed in a fixed menu.

28. The system of claim 26, wherein the display of selectable text indicia is a plurality of options displayed in a fixed menu.

29. The system of claim 24, wherein the user operable terminal includes user operable physical touch buttons on the telephone.

30. The system of claim 24, wherein each of said services are a user selectable option and upon the user's selection of one of said services, the provider (1) communicates data to the user operable terminal of said service; (2) provides the user with access to said data; and (3) enables the user to view and select at least one option from the group consisting of: (a) browse through service categories, (b) view said data by type of service; and (c) view data regarding said selected service.

31. The system of claim 30, wherein services are merchant services and the selectable option from the group comprises selecting a product for purchase whereupon the provider displays to the user a menu requesting payment information from the user.

32. The system of claim 31, wherein the menu requesting payment information from the user provides apparatus that enables the user, through an interconnection with the provider of the service, to enter a user indicia and password whereupon a debit is initiated with respect to charges incurred as a result of a transaction with the provider; and receive a confirmation following successful completion of the transaction with the provider.

33. The system of claim 24, wherein the display presented to the user from the provider is in the form of at least one graphic icon.

34. The system of claim 24, wherein when the user terminal becomes interconnected with the selected provider, the provider responds to the user terminal with a menu display of user selectable choices.

35. The system of claim 24, wherein the record is an historical record.

36. A method of at least one of accessing an account, conducting a transaction, obtaining one of several services, or obtaining information with a user interface for a communications network, said communications network including a user operable terminal for connecting with and sending and receiving communications at a remote location relative to a provider of the account, transaction, service, or information and a gateway service platform for processing and transmitting communications to and from the user operable terminal and to and from at least one computer associated with the provider of the account, transaction, service, or information, said method comprising:

providing, on said user operable terminal a touch screen display of virtual buttons that are changeable in accordance with differing modes of operation of the user operable terminal;

providing an interconnection from the user operable terminal though a gateway service platform for processing and transmitting communications to the provider of the account, transaction, service, or information;

providing, via programming in an internal processing unit in the user operable terminal, a multiplicity of preprogrammed choices represented by different displays of virtual buttons with respect to the account, transaction, service, or information, said multiplicity of preprogrammed choices being perceptible to the user on the touch screen display;

maintaining in a processing unit of the user operable terminal a record of connectivity interconnections associated with predetermined providers of each account, transaction, service, or information displayed;

registering in the user operable terminal the user's input corresponding to the user's selection from the multiplicity of preprogrammed choices displayed on the touch screen display;

communicating through a connectivity interconnection from the user operable terminal to the service platform a user selection registered as user input from the multiplicity of preprogrammed choices and for connecting the user operable terminal to the provider in response to user selection from the multiplicity of preprogrammed choices; and enabling communication between the user and the provider upon user selection from the multiplicity of preprogrammed choices, comprising a switch initiating an interconnection with and data communication between the service platform and the user operable terminal, wherein, upon connection of the user to the provider, the display of the multiplicity of preprogrammed choices on the user operable terminal is ended and the user operable terminal becomes interconnected with the selected provider to access the user selected account, transaction, service, or information.

37. The method of claim 36, wherein, a response of the provider comprises a display on the user terminal of user selectable options offered by the provider in response to the user selection from the multiplicity of preprogrammed choices and response of the user thereto is communicated to the provider whereupon the user selection is fulfilled.

38. The method of claim 37, wherein a display to the user from the provider is in the form of selectable text indicia.

39. The method of claim 37, wherein, the response of the provider comprises a display on the user operable terminal of merchant offerings by the provider, and upon the selection of an offering by the user, a display on the user operable terminal from the provider requests payment information prompting the user to enter identifying indicia whereupon a debit is initiated with respect to the user as a result of a transaction with the provider; and a confirmation following successful completion of the transaction with the provider is sent.

40. The method of claim 39, wherein the debit is entered into a credit system with which the user and provider are associated.

41. The method of claim 37, wherein each of said services are a user selectable option and upon the user's selection of one of said services, the provider (1) communicates data to the user operable terminal of said service; (2) provides the user with access to said data; and (3) enables the user to view and select a further option.

42. The method of claim 41, wherein the provider displays to the user operable terminal a menu requesting payment information from the user and provides apparatus that enables the user, through an interconnection with the provider of the service, to enter a user indicia and password whereupon a debit from the user is initiated into a credit system with which the user and provider are associated with respect to charges incurred as a result of a user transaction with the provider.

43. The method of claim 36, wherein the user operable terminal is a phone.

44. The method of claim 36, wherein the display to the user from the provider is in the form of at least one graphic icon.

45. The method of claim 36, wherein a response of the provider comprises displaying on the user operable terminal a menu of user selectable options.

46. The method of claim 36, wherein the record is an historical record.

47. A system for accessing an account, conducting a transaction, obtaining one of several services, or obtaining information over a network, said network including a user operable terminal in the form of a telephone for sending and receiving communications at a remote location relative to a provider of the account, transaction, service, or information to be accessed and a gateway service platform for processing and transmitting said communications to and from the user operable terminal and to and from at least one provider of the account, transaction, service, or information, said system comprising:

said user operable terminal having a display of user selectable options perceptible to the user that is changeable in accordance with differing modes of operation of the terminal and having an internal processing unit programmed to provide a multiplicity of selectable options with respect to the account, transaction, service, or information such that the user are guided though the options by on-screen directions, said terminal being capable of registering the user's input to the terminal corresponding to the user's selection from the multiplicity of choices and prioritizing information the user is most likely to use next;

data transmission means for communicating the user's selection from among the multiplicity of choices presented by the terminal to the service platform and for communicating data from the service platform to the user terminal;

data receiving means enabling the user terminal to display data concerning the account, transaction, service, or information received from the service platform in response to the user's selection from the multiplicity of choices;

means for maintaining in the user terminal a record of connectivity interconnections associated with predetermined providers of each account, transaction, service, or information displayed;

means for connecting the user terminal through a connectivity interconnection to the provider in response to user selection from the user selectable options; and means for enabling the user to communicate with the provider upon the user's selection from the user selectable options of an account, transaction, service, or information comprising a switch initiating an interconnection with and data communication between, the user terminal and the provider through the service platform wherein, upon connection of the user to the provider, the display of user selectable options on the user terminal is ended and the user terminal becomes interconnected with the selected provider to access the user selected transaction, service, or information.

48. The system of claim 47, wherein, when the provider of an account, transaction mechanism, service, or information is accessed by a user, the response of the provider comprises a display of user selectable options offered by the provider in response to the user selection from the multiplicity of preprogrammed choices and the response of the user thereto is communicated to the provider whereupon the user selection is fulfilled.

49. The system of claim 48, wherein the display presented to the user from the provider is in the form of selectable text indicia.

50. The system of claim 49, wherein the display of selectable indicia is a plurality of options displayed in a fixed menu.

51. The system of claim 49, wherein the display of user selectable indicia is a plurality of options displayed in a fixed menu.

52. The system of claim 47, wherein the user terminal includes user operable physical touch buttons on the telephone.

53. The system of claim 47, wherein each of the services are a user selectable option and upon the user's selection of one of said services, the provider (1) communicates data to the user terminal of said services (2) provides the user with access to said data; and (3) enables the user to view and select an option from: (a) browse through service categories, (b) view said data by type of service; and (c) view data regarding said selected service.

54. The system of claim 53, wherein services are merchant services and the selectable option from the group comprises selecting a product for purchase whereupon the provider displays to the user a menu requesting payment information from the user.

55. The system of claim 54, wherein the menu requesting payment information from the user provides means for enabling the user, through an interconnection with the provider of the service, to enter a user indicia and password whereupon a debit is initiated with respect to charges incurred as a result of a transaction with the provider; and receive a confirmation following successful completion of the transaction with the provider.

56. The system of claim 47, wherein the display presented to the user from the provider is in the form of one or more graphic icons.

57. The system of claim 47, wherein when the user terminal becomes interconnected with the selected provider, the provider responds to the user terminal with a menu display of user selectable choices.

58. The system of claim 47, wherein the record is an historical record.

59. A method of accessing an account, conducting a transaction, obtaining one of several services, or obtaining information with a user interface for a communications network, said communications network including a user operable terminal for connecting with and sending and receiving communications at a remote location relative to a provider of the account, transaction, service, or information and a gateway service platform for processing and transmitting communications to and from the user operable terminal and to and from at least one computer associated with the provider of the account, transaction, service, or information, said method comprising:

providing, on said user operable terminal a touch screen display of virtual buttons that are changeable in accordance with differing modes of operation of the user operable terminal;

providing an interconnection from the user operable terminal through a gateway service platform for processing and transmitting communications to the provider of the account, transaction, service, or information;

providing, via programming in an internal processing unit in the terminal, a multiplicity of preprogrammed choices represented by different displays of virtual buttons with respect to the account, transaction, service, or information, said multiplicity of preprogrammed choices being perceptible to the user on the touch screen display;

maintaining in the processing unit of the user terminal a record of connectivity interconnections associated with predetermined providers of each account, transaction, service, or information displayed;

registering in the terminal the user's input corresponding to the user's selection from the multiplicity of preprogrammed choices displayed on the touch screen display;

communicating through a connectivity interconnection from the user operable terminal to the service platform the user's selection registered as the user's input from the multiplicity of preprogrammed choices and for connecting the user terminal to the provider in response to user selection from the multiplicity of preprogrammed choices;

guiding the user through the options by on-screen directions and prioritizing information the user is most likely to use next; and enabling communication between the user and the provider upon the user's selection from the multiplicity of preprogrammed choices by way of a switch initiating an interconnection with and data communication between the service platform and the user terminal, wherein, upon connection of the user to the provider, the display of the multiplicity of preprogrammed choices on the user terminal is ended and the user terminal becomes interconnected with the selected provider to access the user selected transaction, service, or information.

60. The method of claim 59, wherein, a response of the provider comprises a display on the user operable terminal of user selectable options offered by the provider in response to the user selection from the multiplicity of preprogrammed choices and the response of the user thereto is communicated to the provider whereupon the user selection is fulfilled.

61. The method of claim 60, wherein the display to the user from the provider is in the form of selectable text indicia.

62. The method of claim 60, wherein, the response of the provider comprises a display on the user operable terminal of merchant offerings by the provider, and upon the selection of an offering by the user, a display on the user operable terminal from the provider requests payment information prompting the user to enter identifying indicia whereupon a debit is initiated with respect to the user as a result of a transaction with the provider; and a confirmation following successful completion of the transaction with the provider is sent.

63. The method of claim 62, wherein the debit is entered into a credit system with which the user and provider are associated.

64. The method of claim 60, wherein each of said services are a user selectable option and upon the user's selection of one of said services, the provider (1) communicates data to the user terminal of said service; (2) provides the user with access to said data; and (3) enables the user to view and select a further option.

65. The method of claim 64, wherein the provider displays to the user operable terminal a menu requesting payment information from the user and enables the user, through an interconnection with the provider of the service, to enter a user indicia and password whereupon a debit from the user is initiated into a credit system with which the user and provider are associated with respect to charges incurred as a result of a user transaction with the provider.

66. The method of claim 59, wherein the user terminal is a phone.

67. The method of claim 59, wherein the display to the user from the provider is in the form of one or more graphic icons.

68. The method of claim 59, wherein the response of the provider comprises displaying on the user operable terminal a menu of user selectable options.

69. The method of claim 59, wherein the record is an historical record.

70. A system for at least one of accessing an account, conducting a transaction, obtaining one of several services, or obtaining information over a network, said network including a user operable terminal in a form of a telephone for sending and receiving communications at a remote location relative to a provider of the account, transaction, service, or information to be accessed and a gateway service platform for processing and transmitting said communications to and from the user operable terminal and to and from at least one provider of the account, transaction, service, or information, said system comprising:

said user operable terminal having a display of user selectable options perceptible to the user that are changeable in accordance with differing modes of operation of the user operable terminal and having an internal processing unit programmed to provide a multiplicity of selectable options with respect to the account, transaction, service, or information such that the user are guided through the options by on-screen directions, said terminal being capable of registering the user's input to the terminal corresponding to the user's selection from the multiplicity of choices and prioritizing information the user is most likely to use next;

data transmission apparatus that communicates the user's selection from among the multiplicity of selectable options presented by the user operable terminal to the service platform and for communicating data from the service platform to the user operable terminal;

data receiving apparatus that enables the user operable terminal to display data concerning the account, transaction, service, or information received from the service platform in response to the user's selection from the multiplicity of selectable options;

apparatus that maintains in the user operable terminal a record of connectivity interconnections associated with predetermined providers of each account, transaction, service, or information displayed;

apparatus that connects the user operable terminal through a connectivity interconnection to the provider in response to user selection from the user selectable options; and apparatus that enables the user to communicate with the provider upon the user's selection from the user selectable options of an account, transaction, service, or information comprising a switch initiating an interconnection with and data communication between, the user operable terminal and the provider through the service platform wherein, upon connection of the user to the provider, the display of user selectable options on the user operable terminal is ended and the user operable terminal becomes interconnected with the selected provider to access the user selected account, transaction, service, or information.

71. The system of claim 70, wherein the user operable terminal includes user operable physical touch buttons on the telephone.

72. The system of claim 70, wherein each of said services are a user selectable option and upon the user's selection of one of said services, the provider (1) communicates data to the user operable terminal of said service, (2) provides the user with access to said data; and (3) enables the user to view and select at least one option from the group consisting of: (a) browse through service categories, (b) view said data by type of service; and (c) view data regarding a selected service.

73. The system of claim 72, wherein services are merchant services and the selectable option from the group comprises selecting a product for purchase whereupon the provider displays to the user a menu requesting payment information from the user.

74. The system of claim 73, wherein the menu requesting payment information from the user provides apparatus that enables the user, through an interconnection with the provider of the service, to enter a user indicia and password whereupon a debit is initiated with respect to charges incurred as a result of a transaction with the provider; and receive a confirmation following successful completion of the transaction with the provider.

75. The system of claim 70, wherein the display presented to the user from the provider is in the form of at least one graphic icon.

76. The system of claim 70, wherein when the user terminal becomes interconnected with the selected provider, the provider responds to the user terminal with a menu display of user selectable choices.

77. The system of claim 70, wherein the record is an historical record.

78. A method of at least one of accessing an account, conducting a transaction, obtaining one of several services, or obtaining information with a user interface for a communications network, said communications network including a user operable terminal for connecting with and sending and receiving communications at a remote location relative to a provider of the account, transaction, service, or information and a gateway service platform for processing and transmitting communications to and from the user operable terminal and to and from at least one computer associated with the provider of the account, transaction, service, or information, said method comprising:

providing, on said user operable terminal a touch screen display of virtual buttons that are changeable in accordance with differing modes of operation of the user operable terminal;

providing an interconnection from the user operable terminal through a gateway service platform for processing and transmitting communications to the provider of the account, transaction, service, or information;

providing, via programming in an internal processing unit in the user operable terminal, a multiplicity of preprogrammed choices represented by different displays of virtual buttons with respect to the account, transaction, service, or information, said multiplicity of preprogrammed choices being perceptible to the user on the touch screen display;

maintaining in a processing unit of the user operable terminal a record of connectivity interconnections associated with predetermined providers of each account, transaction, service, or information displayed;

registering in the user operable terminal the user's input corresponding to the user's selection from the multiplicity of preprogrammed choices displayed on the touch screen display;

communicating through a connectivity interconnection from the user operable terminal to the service platform a user selection registered as user input from the multiplicity of preprogrammed choices and for connecting the user operable terminal to the provider in response to user selection from the multiplicity of preprogrammed choices;

guiding the user through the options by on-screen directions and prioritizing information the user is most likely to use next; and enabling communication between the user and the provider upon user selection from the multiplicity of preprogrammed choices, comprising a switch initiating an interconnection with and data communication between the service platform and the user operable terminal, wherein, upon connection of the user to the provider, display of the multiplicity of preprogrammed choices on the user operable terminal is ended and the user operable terminal becomes interconnected with the selected provider to access the user selected account, transaction, service, or information.

79. The system of claim 78, wherein, when the provider of an account, transaction mechanism, service, or information is accessed by a user, response of the provider comprises a display of user selectable options offered by the provider in response to the user selection from the multiplicity of preprogrammed choices and response of the user thereto is communicated to the provider whereupon the user selection is fulfilled.

80. The system of claim 79, wherein a display is presented to the user from the provider in the form of selectable text indicia.

81. The system of claim 80, wherein the display of selectable text indicia is a plurality of options displayed in a fixed menu.

82. The system of claim 80, wherein the display of selectable text indicia is a plurality of options displayed in a fixed menu.

83. The method of claim 78, wherein, a response of the provider comprises a display on the user operable terminal of user selectable options offered by the provider in response to the user selection from the multiplicity of preprogrammed choices and response of the user thereto is communicated to the provider whereupon the user selection is fulfilled.

84. The method of claim 83, wherein a display to the user from the provider is in the form of selectable text indicia.

85. The method of claim 83, wherein, the response of the provider comprises a display on the user operable terminal of merchant offerings by the provider, and upon the selection of an offering by the user, a display on the user operable terminal from the provider requests payment information prompting the user to enter identifying indicia whereupon a debit is initiated with respect to the user as a result of a transaction with the provider; and a confirmation following successful completion of the transaction with the provider is sent.

86. The method of claim 85, wherein the debit is entered into a credit system with which the user and provider are associated.

87. The method of claim 83, wherein each of the services are a user selectable option and upon the user's selection of one of said services, the provider (1) communicates data to the user operable terminal of said selected service (2) provides the user with access to said data; and (3) enables the user to view and select a further option.

88. The method of claim 87, wherein the provider displays to the user operable terminal a menu requesting payment information from the user and provides apparatus that enables the user, through an interconnection with the provider of the service, to enter a user indicia and password whereupon a debit from the user is initiated into a credit system with which the user and provider are associated with respect to charges incurred as a result of a user transaction with the provider.

89. The method of claim 78, wherein the user operable terminal is a phone.

90. The method of claim 78, wherein the display to the user from at the provider is in the form of at least one graphic icon.

91. The method of claim 78, wherein a response of the provider comprises displaying on the user operable terminal a menu of user selectable options.

92. The system of claim 78, wherein the record is an historical record.

* * * * *